(12) United States Patent
Ayers (10) Patent No.: US 9,908,476 B2
(45) Date of Patent: Mar. 6, 2018

(54) VEHICLE HITCH ASSEMBLY FOR SUSPENSION SUPPORT OF AN ACCESSORY

(76) Inventor: Bradley V. Ayers, Pittsburgh, PA (US)

( * ) Notice: Subject to any disclaimer, the term of this patent is extended or adjusted under 35 U.S.C. 154(b) by 1466 days.

(21) Appl. No.: 12/283,629

(22) Filed: Sep. 15, 2008

(65) Prior Publication Data

US 2009/0014488 A1   Jan. 15, 2009

Related U.S. Application Data

(63) Continuation-in-part of application No. 11/880,019, filed on Jul. 19, 2007, now abandoned.

(60) Provisional application No. 60/922,723, filed on Apr. 10, 2007, provisional application No. 60/931,859, filed on May 26, 2007, provisional application No. 60/933,009, filed on Jun. 4, 2007.

(51) Int. Cl.
  *B60R 9/06* (2006.01)

(52) U.S. Cl.
  CPC ................................ *B60R 9/06* (2013.01)

(58) Field of Classification Search
  CPC .................................................... B60R 9/06
  USPC .... 224/512, 513, 519, 520, 492, 521, 405.1;
    280/405.1, 406.1, 455.1, 456.1, 457,
    280/461.1, 477, 490.1, 497, 501, 502,
    280/504, 506, 507; 403/141; 248/354.1
  See application file for complete search history.

(56) References Cited

U.S. PATENT DOCUMENTS

| | | | | |
|---|---|---|---|---|
| 2,738,206 A | * | 3/1956 | Loughner | 280/461.1 |
| 2,793,879 A | * | 5/1957 | Bair | 280/406.2 |
| 3,434,735 A | * | 3/1969 | Bernard | 280/406.2 |
| 3,528,578 A | * | 9/1970 | Schoenberger | 414/462 |
| 3,756,618 A | * | 9/1973 | Lewis | 280/489 |
| 3,805,984 A | * | 4/1974 | Schwarz et al. | 414/462 |
| 3,913,811 A | * | 10/1975 | Spencer | 224/508 |
| 4,084,736 A | * | 4/1978 | Jacobs, Jr. | 414/462 |
| 4,248,451 A | * | 2/1981 | Usinger | 280/490.1 |
| 4,593,840 A | * | 6/1986 | Chown | 224/520 |
| 5,090,718 A | * | 2/1992 | Kauffman | 280/402 |
| 5,290,056 A | * | 3/1994 | Fath, IV | 280/477 |
| 5,462,398 A | * | 10/1995 | Hymer | 414/462 |
| 6,155,587 A | * | 12/2000 | Milazzo | 280/457 |

* cited by examiner

*Primary Examiner* — Nathan J Newhouse
*Assistant Examiner* — Scott McNurlen
(74) *Attorney, Agent, or Firm* — Carothers & Carothers (57) ABSTRACT

A vehicle hitch assembly for suspension support of an accessory from the rear of a vehicle having a rear bumper and a trailer hitch receiver positioned under the bumper. The hitch assembly includes a horizontally extending rigid trailer hitch receiver insert for insertion and retention in the vehicle trailer hitch receiver, and a rigid support arm having one end adjustably and detachably securable to the vehicle rear bumper and another end thereof rigidly and adjustably securable to the trailer hitch receiver insert. An accessory support is then secured to the vehicle hitch assembly for supporting a load off of the rear of the vehicle.

12 Claims, 12 Drawing Sheets

VEHICLE HITCH ASSEMBLY FOR SUSPENSION SUPPORT OF AN ACCESSORY

CROSS REFERENCE

This application is a continuation-in-part of application Ser. No. 11/880,019, filed Jul. 19, 2007, which claims the benefit of the following U.S. Provisional Patent Applications, the contents of which are incorporated herein by reference:
Application No. 60/922,723, filed Apr. 10, 2007;
Application No. 60/931,859, filed May 26, 2007; and
Application No. 60/933,009, filed Jun. 4, 2007.

BACKGROUND OF THE INVENTION

The present invention relates to a vehicle hitch assembly for suspension support of an accessory from the rear of a vehicle.

Present day pickup trucks and sport utility vehicles are often provided with a Class III or Class IV trailer hitch which has a horizontal box receiver positioned below the rear bumper of the vehicle. Instead of towing a trailer it is common practice to support a rack or accessory support in suspension from this hitch receiver to support an accessory in suspension off the rear of the vehicle, such as a rack to support a lawn tractor, spreader or a motorcycle, or a platform supporting luggage, equipment or containers, or for supporting a boom, crane or lift. For example, see Liscinsky, U.S. Pat. No. 5,310,100, issued May 10, 1994, for CARRIER FOR MOUNTING ON VEHICLE HITCH.

The problem encountered with such carriers is that the trailer hitch receivers are designed to handle the tongue weight of a trailer and the pushing and pulling stresses of towing a trailer. They are not designed for excessively heavy torque loads applied downwardly on the hitch receiver imposed by heavy loads supported in suspension on a rack or platform supported from the receiver hitch.

U.S. Pat. No. 6,148,928, issued on Nov. 21, 2000 to Spears, discloses a hitch assembly which attaches to a pickup truck and which attempts to eliminate or reduce this problem. This hitch assembly supports a 3 point hitch from the rear of the pickup truck by supporting the device in suspension not only from the hitch receiver of a Class III or Class IV hitch, but in addition, further supports the load from a goose neck hitch mounted in the center of the truck bed above the rear axle of the truck. However, the problem here encountered is that the pickup truck bed cannot otherwise be utilized in its intended manner for accommodating a load, and in addition, the pickup truck tailgate cannot be used in its normal intended manner. This also holds true for sport utility vehicles and vans as such a hitch assembly would interfere with the normal use of the cargo area and the tailgate or lift back.

It is a principal object of the present invention to provide a hitch assembly for suspension support of an article from the rear of a vehicle which eliminates these aforementioned deficiencies and provides adequate support for supporting heavy loads from the rear of the vehicle in suspension.

SUMMARY OF THE INVENTION

The vehicle hitch assembly of the present invention is provided for suspension support of an accessory from the rear of a vehicle of any type having a rear bumper and a trailer hitch receiver, or other such rigid trailer mounting device, collectively referred to as a trailer hitch receiver device, positioned under the bumper. The vehicle hitch assembly of the present invention is comprised of a horizontally extending rigid trailer hitch receiver insert for insertion and retention into the trailer hitch receiver, and a rigid support arm having one end detachably secured to the vehicle rear bumper and the other end thereof secured to the trailer hitch receiver insert. An accessory support, such as a platform or rack is secured to this assembly for supporting an accessory in suspension off the rear of the vehicle.

The other end of the support arm which is secured to the trailer hitch receiver, is adjustably securable to the receiver insert in a vertical direction. This permits vertical adjustability of the hitch assembly to accommodate different vehicles having different vertical spacing between the horizontally extending trailer hitch receiver and the rear bumper of the vehicle. In addition, for some embodiments of the present invention, this permits rigid engagement of the support arm with the vehicle rear bumper. For additional securement in this embodiment, an additional securing means, such as a bolt, is used for vertically clamping the support arm to the trailer hitch receiver insert. To accommodate for fitment in the horizontal direction, the trailer hitch receiver insert may be provided with multiple spaced pin securement passages there along so that the insert may be adjusted in the horizontal direction and there secured with a pin in a conventional manner to the trailer hitch receiver box. Other adjustment arrangements are possible depending upon the type of trailer hitch receiver device being used.

In one embodiment of the vehicle hitch assembly of the present invention, the end of the support arm which is secured to the rear bumper of the vehicle is secured to the rear bumper through a rigid downwardly open cup which is dimensioned for reception of a ball hitch secured to the upper surface of the vehicle rear bumper. In a second embodiment, the end of the support arm that is connected to the rear bumper of the vehicle is connected through a rigid downwardly protruding pin extending downwardly from the arm for reception in a corresponding pin socket provided in the upper surface of the vehicle rear bumper. In yet a third embodiment of the vehicle hitch assembly of the present invention, the end of the support arm which is connected to the rear bumper of the vehicle is secured thereto through a horizontal elongated rigid support member, such as an angle iron, and this elongated support member is secured there along to the rear bumper of the vehicle. This latter embodiment, provides the greatest torque stabilizing characteristics along the width of the rear bumper so that when heavy swinging torque loads applied from one side to the other side of the vehicle are not born solely by the hitch receiver insert, but rather are uniformly distributed across the rear bumper of the vehicle.

In another embodiment of the present invention, the vehicle rear bumper securing device, such as a downwardly turned ball cup or pin is provided on the one end of the rigid support arm, and it is adjustably movable in a horizontal direction relative to the receiver insert so that the support arm can be incrementally adjusted in the horizontal direction for attachment to the rear bumper. Either the support arm itself may be adjusted horizontally relative to the receiver insert or the securing device itself, such as the bumper hitch ball cup or pin, may be made movable relative to the support arm, which of course also makes its movable relative to the receiver insert. Once this securing device is moved to the proper position, it may be fixedly secured to the support arm after such adjustment. This adjustment capability of the support arm or its rear bumper securing device, in combination with the horizontal adjustability of the receiver insert, in further combination with the vertical adjustability of the support arm relative to the receiver insert provides maximum possible adjustment of the vehicle hitch assembly of the present invention whereby it will fit any bumper hitch/trailer hitch combination.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

DETAILED DESCRIPTION OF THE PREFERRED EMBODIMENTS

Referring first to a first embodiment of the present invention illustrated in FIGS. 1 through 6, the hitch assembly 10 of the present invention is provided for suspension support of an accessory from the rear 11 of a vehicle 12, which in this instance is a pickup truck, having a rear bumper 13 and a trailer hitch receiver 14 secured to the frame of the vehicle and positioned under the rear bumper 13. Trailer hitch receiver 14 is a conventional tubular receiver box, such as is used in Class III or IV hitches.

The vehicle hitch assembly 10 of the present invention is comprised of a horizontally extending rigid trailer hitch receiver insert 15 for insertion and retention in the vehicle trailer hitch receiver 14 in conventional fashion. The receiver hitch insert 15 is a tubular tongue member dimensioned to be slidably received horizontally into the tubular box of receiver 14 until the passages 16 through insert 15 are aligned with the passages 17 of receiver 14 so that securing pin 18 may be passed therethrough and secured on the other side with safety clip 19.

Vehicle hitch assembly 10 is further comprised of rigid support arm 20 having one end 21 detachably secured to the vehicle rear bumper 13, and the other end 22 thereof securable to the trailer hitch receiver insert 15.

Figure 1:
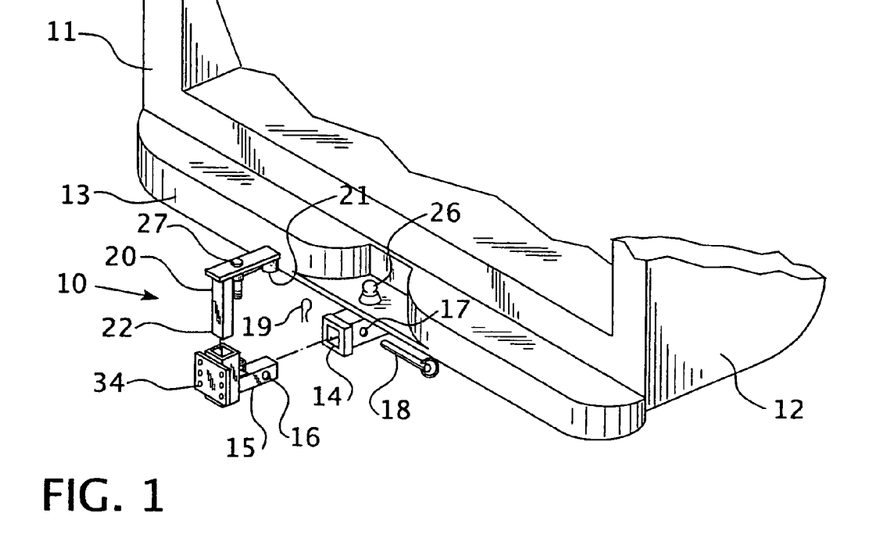
FIG. 1 is a perspective view of a first embodiment of the vehicle hitch assembly of the present invention with the parts thereof shown in an exploded relationship with respect to each other.
Figure 2:
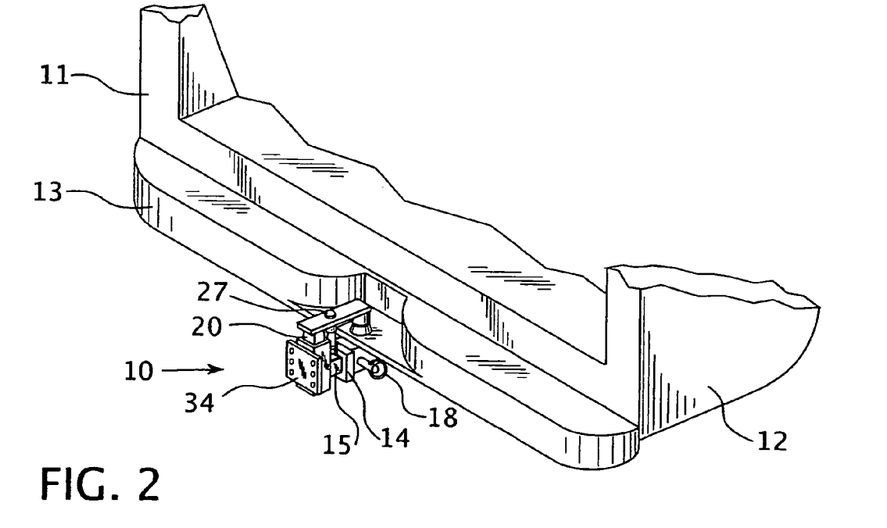
FIG. 2 is a perspective view of the vehicle hitch assembly embodiment shown in FIG. 1 with the parts thereof shown in assembled configuration.
Figure 3:
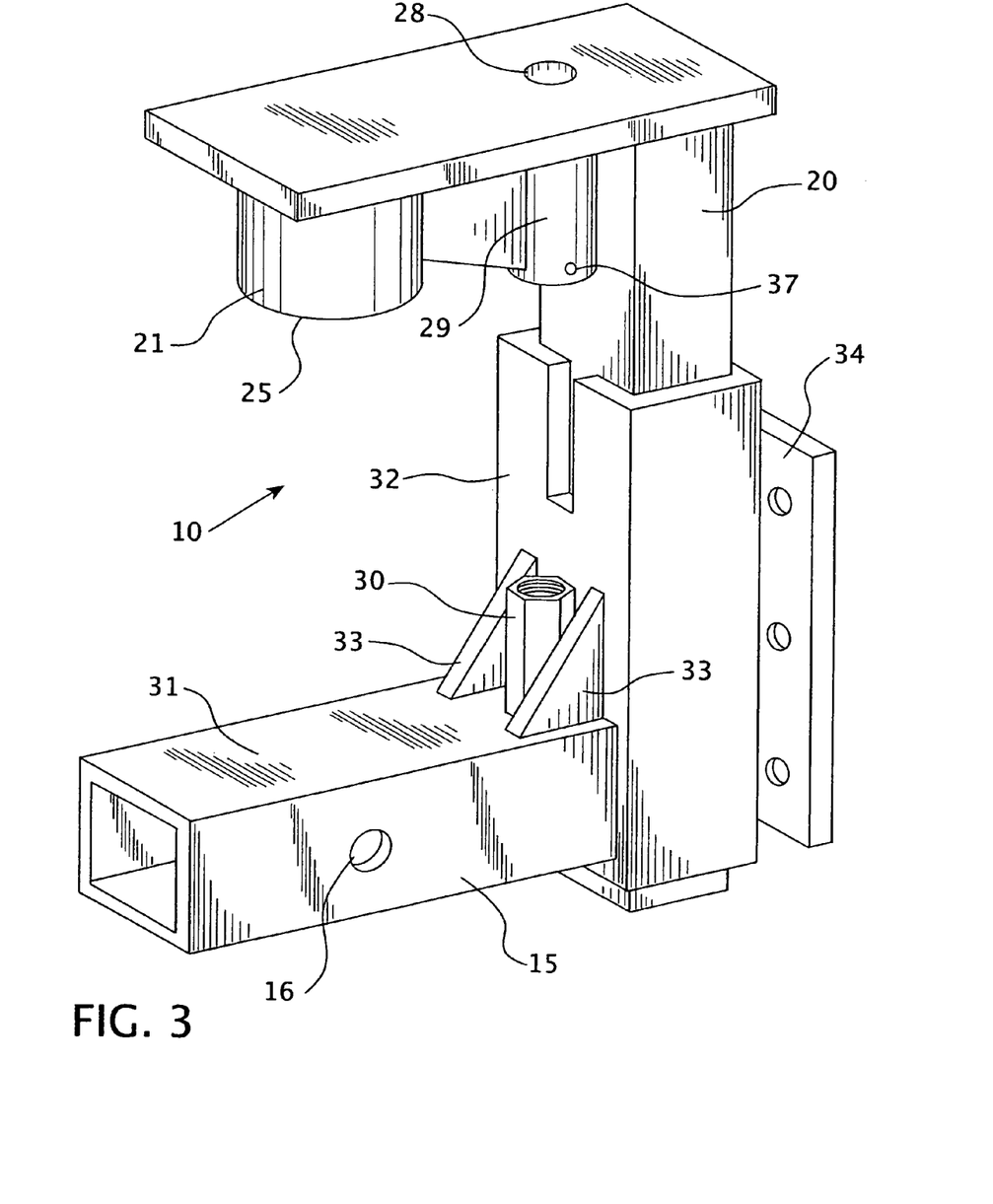
FIG. 3 is an enlarged perspective view of the vehicle hitch assembly alone shown in FIG. 2 without securement to a vehicle rear bumper, and shown in reverse perspective.
Figure 4:
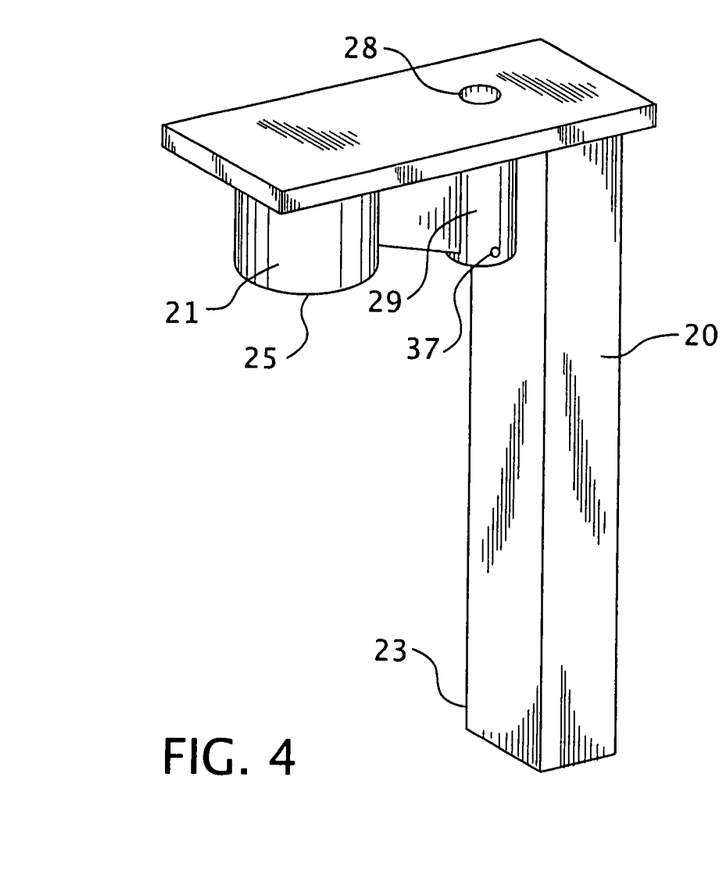
FIG. 4 is a perspective view of the upper rigid support arm portion of the assembly shown in FIG. 3.
Figure 5:
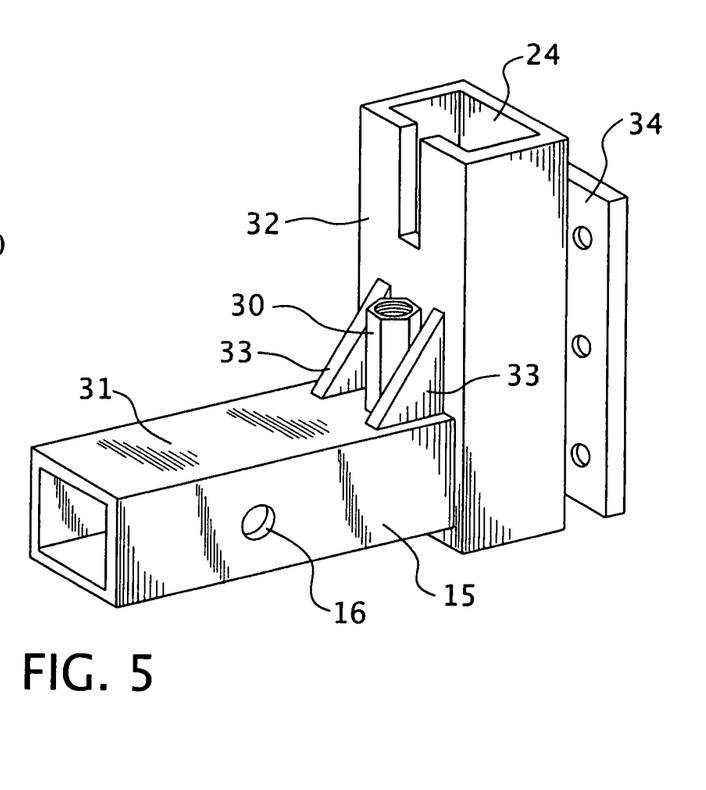
FIG. 5 is a perspective view of the lower trailer hitch receiver insert portion of the assembly shown in FIG. 3.

The end 22 of support arm 20 is adjustably securable in a vertical direction to receiver insert 15. The end 22 is a square tubular member that is slidably received in the square upwardly open socket 24 of receiver insert 15. End 21 of support arm 20 is provided with a downwardly open ball hitch hood or cup 25 dimensioned for reception of hitch ball 26 provided on the rear bumper 13 of vehicle 12.

After the vehicle hitch assembly 10 is fully assembled as illustrated in FIGS. 2, 3, 6 and 7, a securing bolt 27 (FIG. 6) is passed downwardly through orifice 28 and sleeve 29 and then threadably engaged with sleeve nut 30, which is welded to the hitch receiver insert 15, for thereby securing support arm 20 to receiver insert 15 to vertically clamp them securely together in rigid engagement with the hitch ball 26 securely received within ball cup 25.

Figure 6:
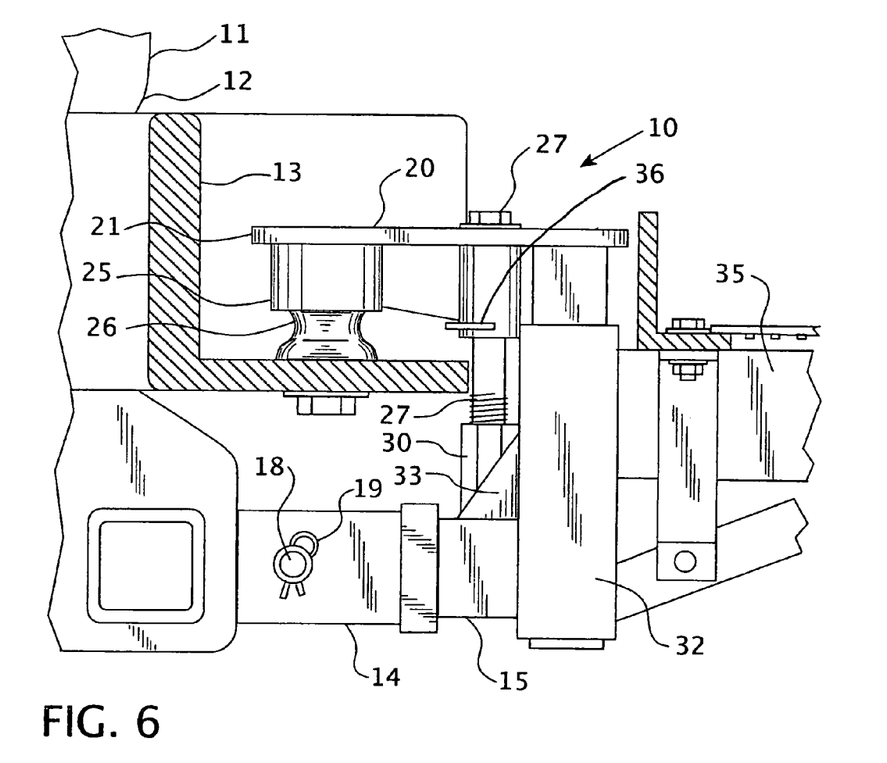
FIG. 6 is an enlarged view in side elevation of the vehicle hitch assembly of the type shown in FIG. 2 with an article or accessory support platform attached and with a portion of the rear bumper sectioned away to reveal the rear bumper hitch ball of the vehicle and securement of the hitch assembly thereto.
Figure 7:
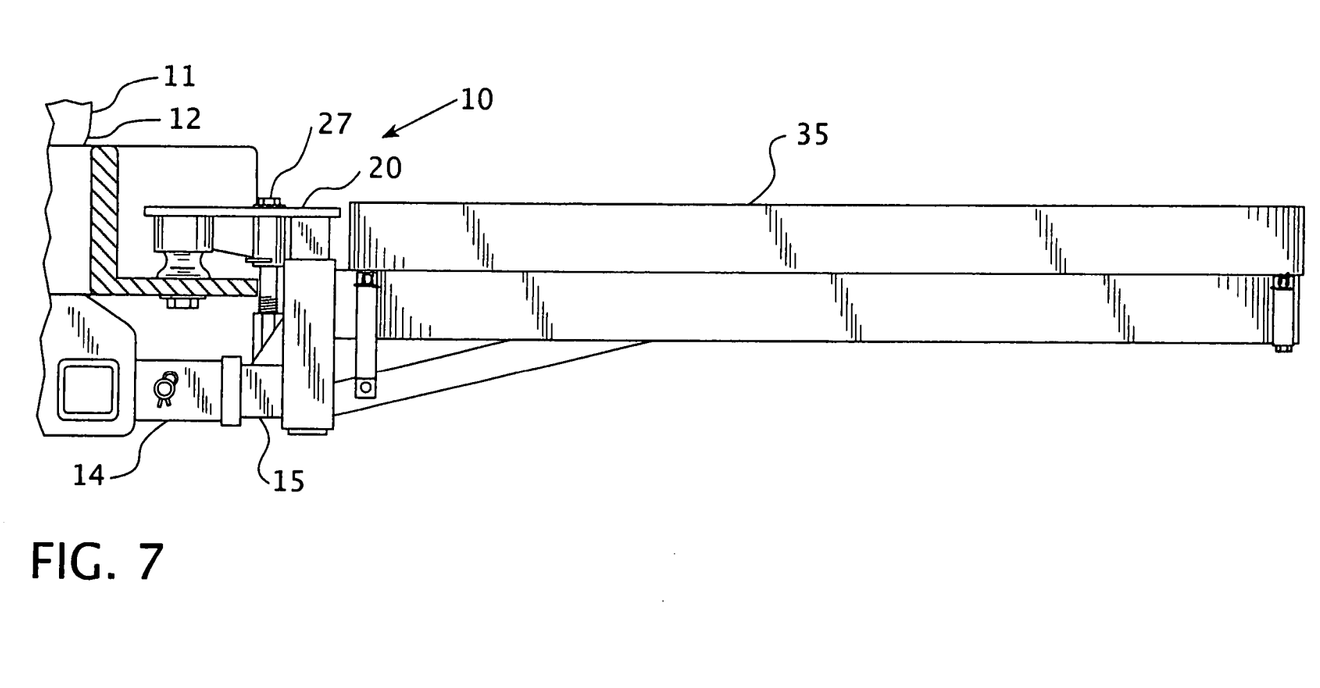
FIG. 7 is a view in side elevation in reduced scale of the hitch assembly configuration shown in FIG. 6 illustrating the accessory platform in full.

Receiver insert 15 is constructed of a horizontally extending tubular tongue member 31 which is welded to vertically extending socket tube 32 which extends upwardly at right angles. To reinforce this connection, gusset plates 33 are also welded to the inside corner of the connection between these members for additional support. A mounting plate 34 is welded to the vertical tubular member 32 for detachable securement of an accessory support, such as support platform or rack 35 as shown in FIGS. 6 and 7. However, the rack 35 in FIGS. 6 and 7 is directly secured to the vertical member 32 of insert 15 without the use of a plate 34 as by welding. Rack 35 is a support which is wide enough to support equipment, such as a lawn tractor, an all terrain vehicle, luggage, etc.

Passage 16 is provided in horizontal tongue member 31 in the horizontal direction at the appropriate position to permit adjustment of the receiver insert 15 in the horizontal direction in order to fit the different horizontal displacements of different vehicles between the rear bumper hitch ball 13 and the mouth of the trailer hitch receiver 14.

Figure 8:
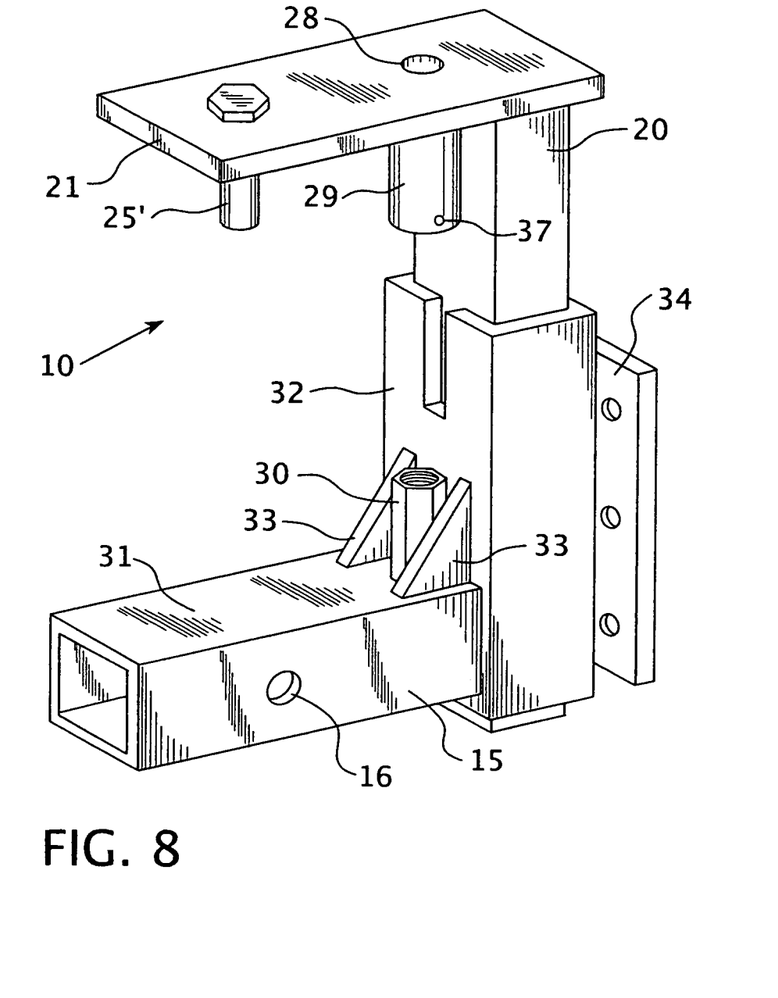
FIG. 8 is an enlarged perspective view illustrating a second embodiment of the vehicle hitch assembly of the present invention.
Figure 9:
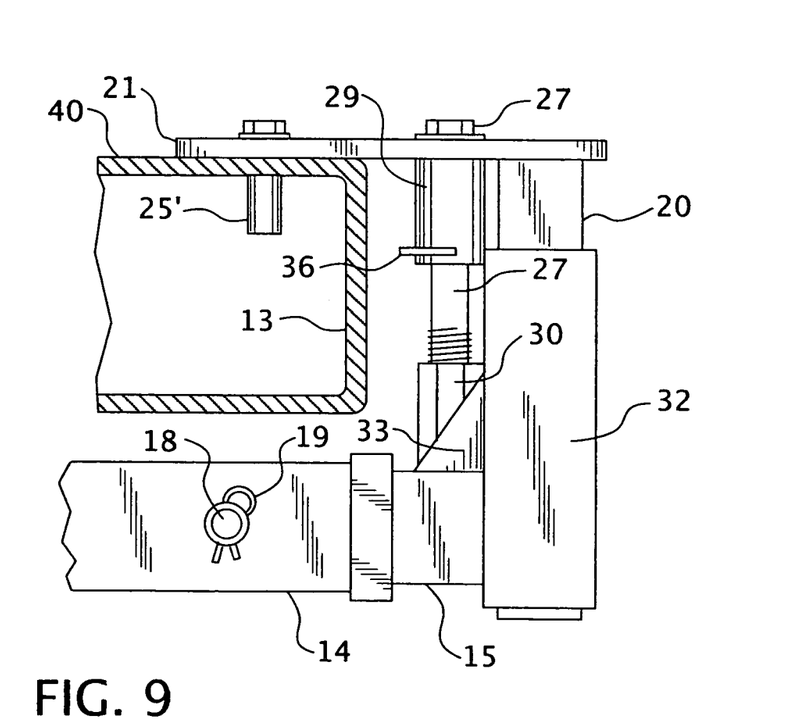
FIG. 9 is a view in side elevation of the hitch assembly embodiment shown in FIG. 8 illustrated as being attached to a trailer hitch receiver and a rear bumper, shown in cross section, of a vehicle not including a rear bumper hitch ball, such as a sport utility vehicle or van.
Figure 10:
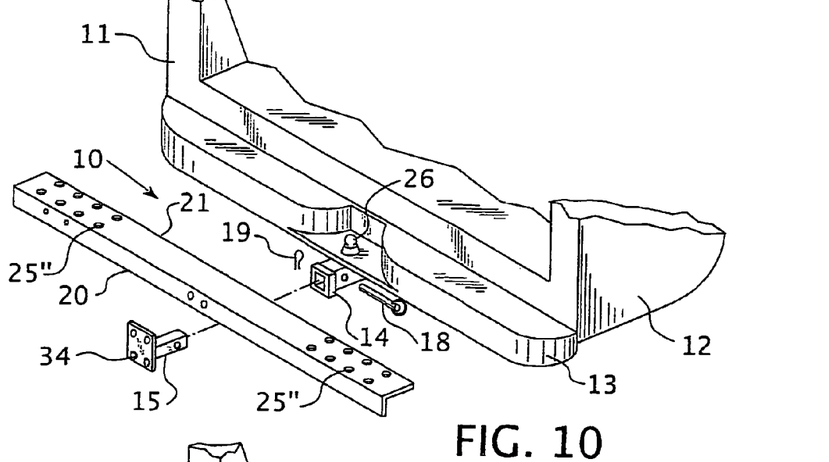
FIG. 10 is an exploded perspective view illustrating a third embodiment of the vehicle hitch assembly of the present invention.
Figures 11, 12:
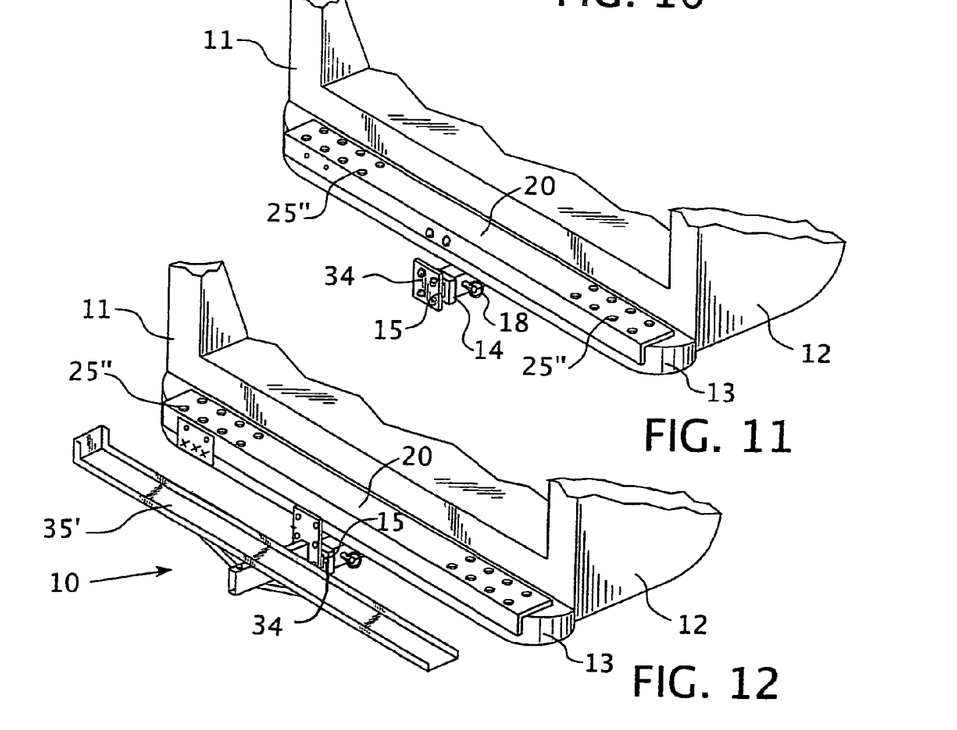
FIG. 11 is a perspective view of the hitch assembly shown in FIG. 10 in assembled condition.
FIG. 12 is a perspective view showing the hitch assembly illustrated in FIG. 11 with an accessory support secured thereto for support of a load, such as a motorcycle.
Figure 13:
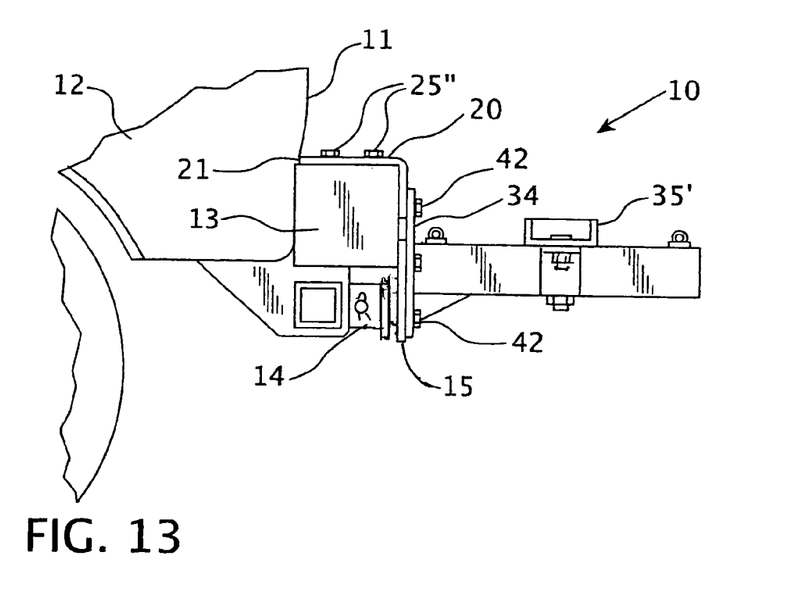
FIG. 13 is a view in side elevation of the vehicle hitch assembly shown in FIG. 12.

Referring next to the embodiment of the vehicle hitch assembly 10 of the present invention illustrated in FIGS. 8 and 9, like parts are designated with the same reference numerals, and the operation of the hitch assembly 10 illustrated in FIGS. 8 and 9 is identical to that of the previously illustrated embodiment with the exception that in this embodiment the assembly 10 does not require a rear bumper hitch ball 26.

In this embodiment, the hitch assembly 10 is attached to the rear of a vehicle which has a rear bumper but no rear bumper hitch ball, such as a sport utility or a van. The rear bumper 13 instead is provided with a pin bore or socket in its top 40 for downward reception therethrough of pin 25' which is rigidly secured to the end 21 of sport arm 20. In all other respects the hitch assembly is assembled in the same manner as the previous embodiment. In the first two embodiments of FIGS. 1 through 9, a pin 36 is also illustrated as being received through bore 37 in sleeve 29 and bolt 27 to ensure that bolt 27 will not threadably detach after securement. Pin 36 is secured with a clip (not shown) after insertion.

Referring next to FIGS. 10, 11, 12, 13 and 14, a third embodiment of the hitch assembly 10 of the present invention is illustrated. Again, similar components are designated with the same reference numerals. In this embodiment, the support arm 20 is comprised of a rigid elongated section of angle iron which is secured to the trailer hitch receiver insert 15 with bolts 42 and plate 34, which in this instance is made part and parcel of the insert 15.

Figure 14:
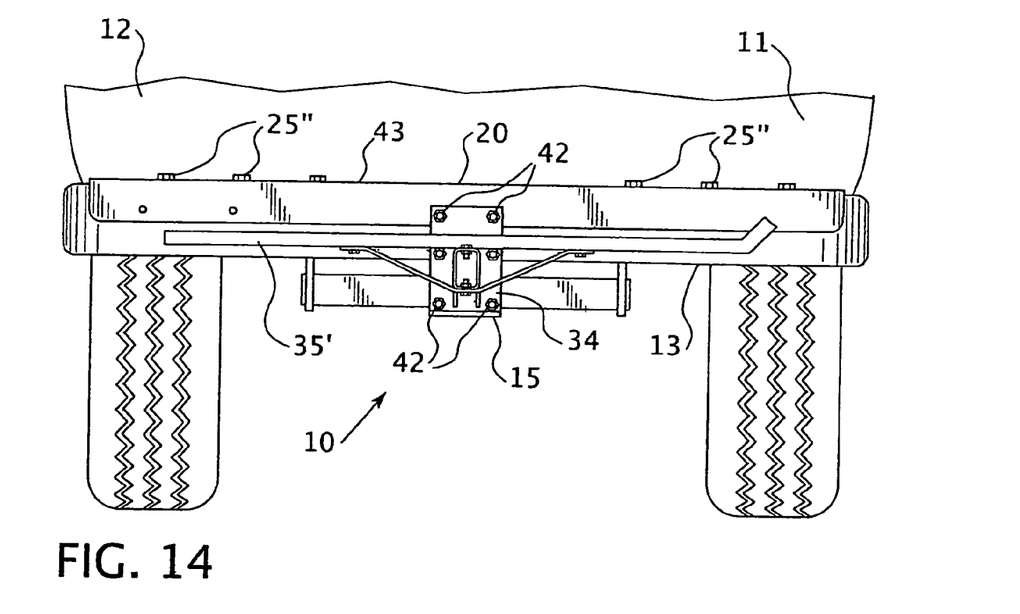
FIG. 14 is a view in rear elevation of the hitch assembly shown in FIG. 13.

Support arm 20 is secured along its upper surface 43 with bolts 25". This uniformly distributes any side to side torque loads applied to accessory rack 35' along the entire width of rear bumper 13. Thus if a heavy motorcycle is supported from accessory support 35', side to side torque loads applied to the left and right side of the hitch assembly 10 as shown in FIG. 14 will be uniformly distributed along bumper 13 thereby permitting the suspended support carriage of long heavy loads across the back of the vehicle 12.

Figure 15:
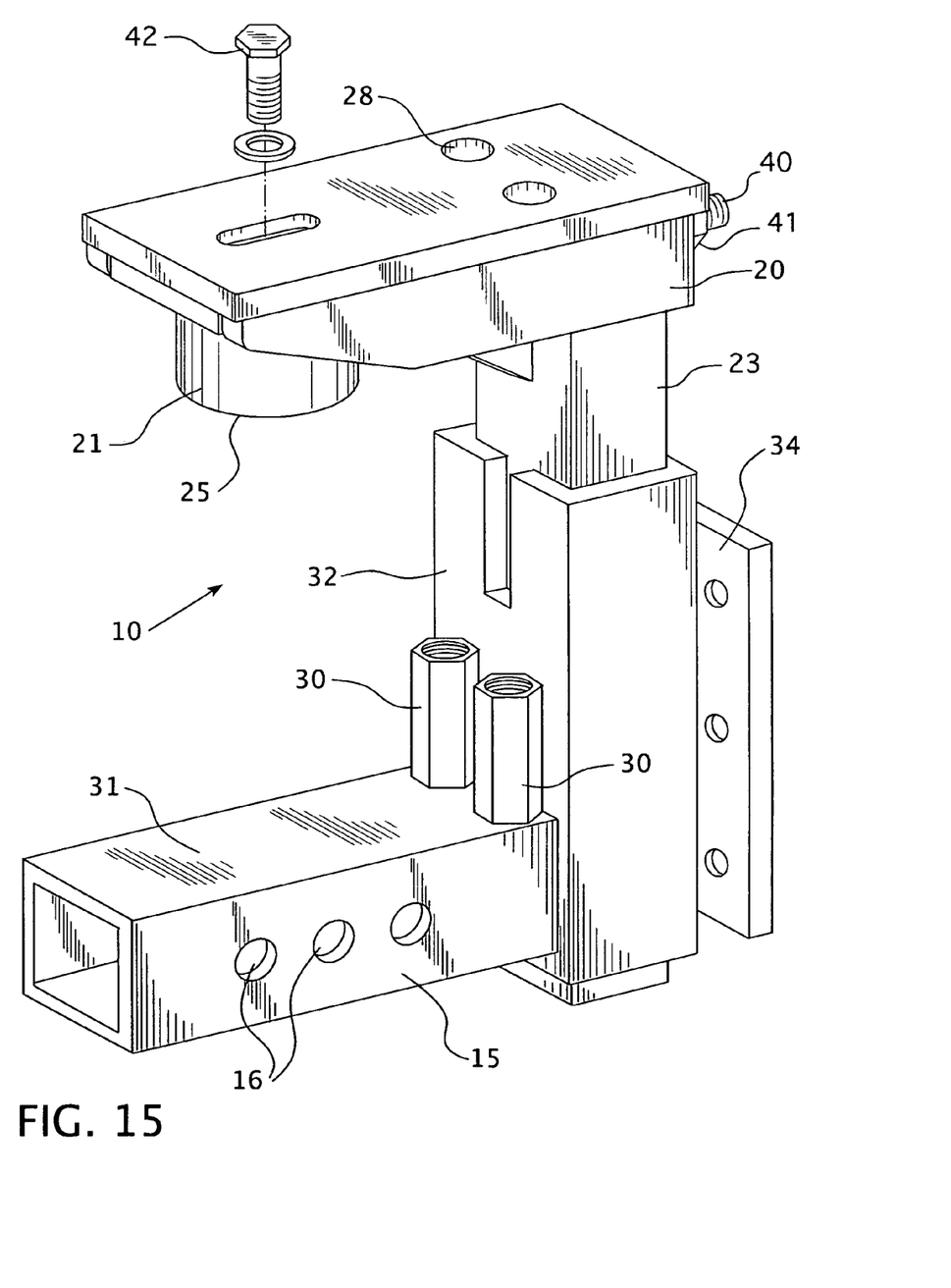
FIG. 15 is a perspective view illustrating another embodiment of the vehicle hitch assembly of the present invention wherein all parts thereof are fully adjustable in the horizontal and vertical direction in order to fit any bumper and trailer hitch combination.
Figure 16:
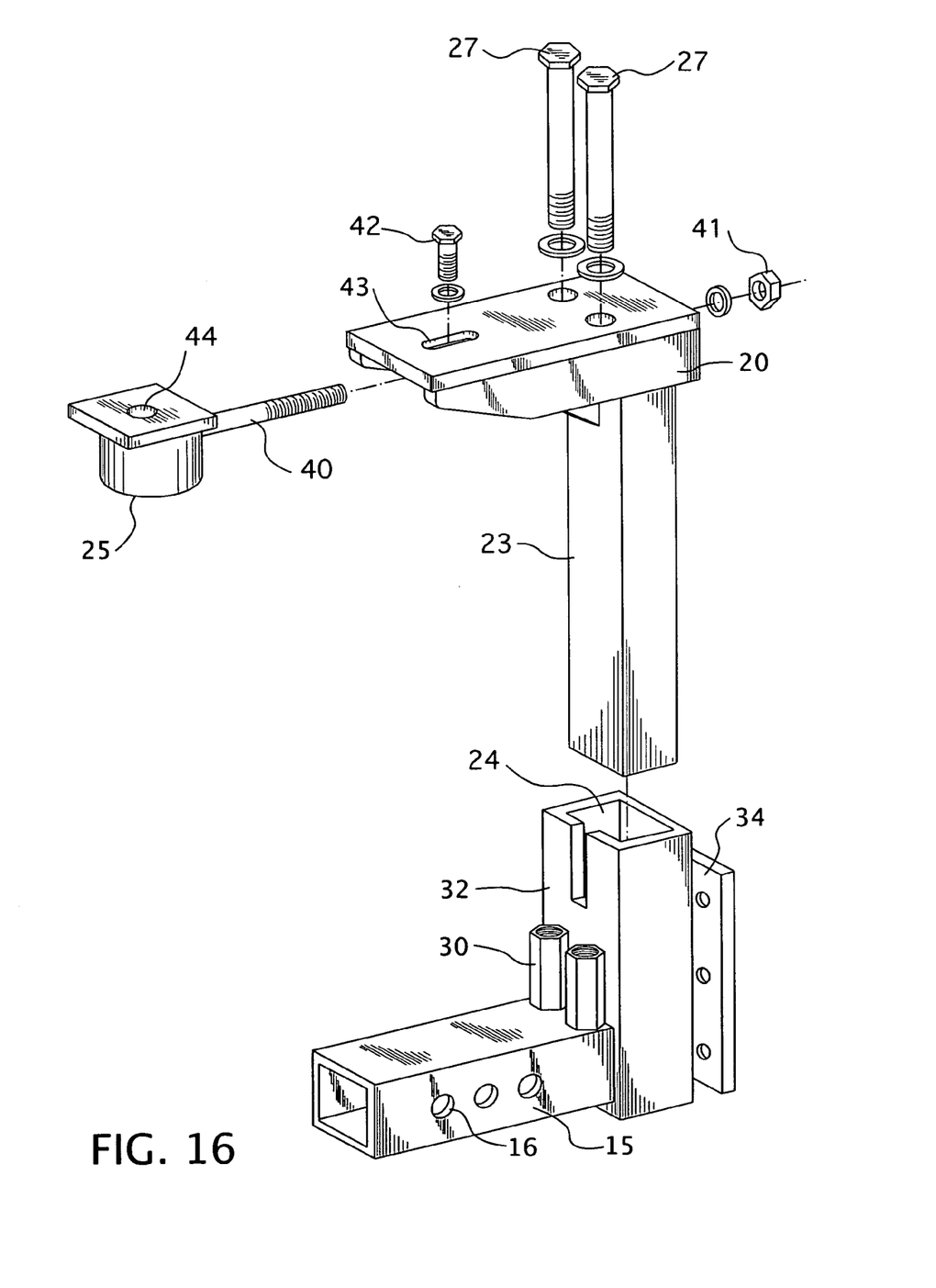
FIG. 16 is an exploded view of the vehicle hitch assembly as shown in FIG. 15.

Referring to FIGS. 15 and 16, another embodiment of the vehicle hitch assembly of the present invention is illustrated and similar parts are accordingly designated with the same reference numerals.

The primary difference with this embodiment, with respect to the previous embodiments, is that first of all more of the passages 16 are provided in insert 15 in order to provide maximum adjustability for horizontal positioning of the receiver hitch insert 15 relative to the trailer hitch receiver 14 on the vehicle as is shown in other drawings herein. In addition, the ball hitch cup 25 is provided as the securing device for securing the one end 21 of support arm 20 to a ball 26 (see FIG. 1) on the vehicle bumper 13. In this embodiment the securing device in the form of cup 25 is horizontally movable relative to support arm 20 such that the cup 25 is movable in a horizontal direction relative to the receiver insert 15. This permits full adjustment of the vehicle hitch assembly 10 in order to fit any bumper/trailer hitch receiver combination for any vehicle. The horizontal adjustment here is permitted to horizontally move with regard to the receiver insert 15, but instead, support arm 20 itself may adjust horizontally with respect to insert 15. Ultimate clamping between the support arm 20 and receiver insert 15 is provided by means of bolts 27.

Cup 25 is adjustable relative to support arm 20 by means of bolt member 40 which is secured to cup 25. In turn, cup 25 slides relative to and underneath support arm 20 and the horizontal position of cup 25 is positioned relative to support arm 20 by means of nut 41 which is secured on the distal end of bolt 40 to accordingly position cup 25. Once cup 25 is properly positioned, it is secured in place by means of bolt 42 through passage 43 whereby it is received in threaded bore 44 of cup 25 so that once cup 25 is properly positioned relative to support arm 20 and it is there clamped in place by bolt 42.

Figure 17:
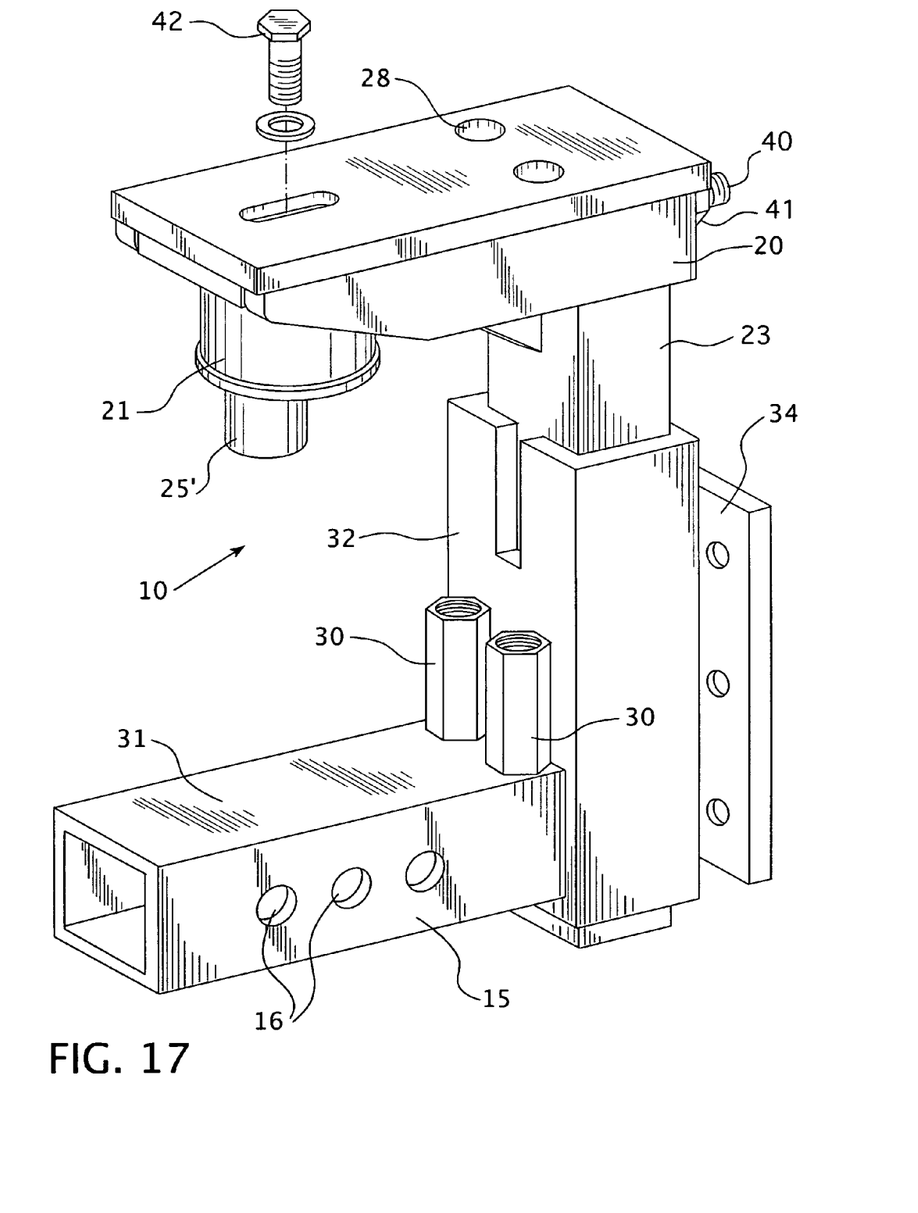
FIG. 17 is a perspective view of the embodiment shown in FIG. 15 wherein a bumper pin hitch assembly is substituted for the ball hitch cup to secure the support arm portion of the assembly to the rear bumper of a vehicle.

Referring to the embodiment shown in FIG. 17, it is in all respects identical to the embodiment illustrated in FIGS. 15 and 16, except for the fact that the downwardly depending or extending ball cup 25 is replaced with a downwardly extending pin 25' which is received in a corresponding pin receiver passage in the upper surface of the vehicle rear bumper in the same fashion as the embodiment described with regard to FIG. 8. This embodiment is well adapted for pin 25' to fit an existing aperture in a stepped rear bumper which is normally intended for a hitch ball attachment. The embodiment illustrated in FIG. 9 is shown in use with a vehicle straight rear bumper wherein the aperture in top surface 40 of the bumper 13 for receiving pin 25' is drilled. In either case, the horizontal adjustment feature of pin 25' as shown in FIG. 17 may be employed.

I claim:

1. A vehicle hitch assembly for suspension support of an accessory from the rear of a vehicle having a rear bumper and a single rearwardly extending arm providing a trailer hitch receiver located on a longitudinal centerline of said vehicle and fixedly secured in a rigid non-hingable manner to a frame of the vehicle in a horizontal direction of extension under said bumper, said hitch assembly comprising;

a horizontally extending rigid trailer hitch receiver insert for insertion and retention in said vehicle trailer hitch receiver;

a rigid support arm having one end detachably securable to said vehicle rear bumper and another end thereof securable to said trailer hitch receiver insert;

securing means vertically rigidly tying and retaining said support arm and said trailer hitch receiver insert together;

means for securing an accessory support to said hitch assembly whereby said support is supported therefrom in suspension;

said another end of said support arm is adjustably securable in a vertical direction to said receiver insert; and wherein said receiver insert is adjustably securable in a horizontal direction in said hitch receiver.

2. The vehicle hitch assembly of claim 1, wherein said one end of said support arm is comprised of a rigid downwardly open cup dimensioned for reception of a hitch ball secured to an upper surface of said vehicle rear bumper.

3. The vehicle hitch assembly of claim 1, wherein said one end of said support arm includes at least one rigid downwardly extending pin for reception in a corresponding pin socket in an upper surface of said rear bumper.

4. The vehicle hitch assembly of claim 1, wherein said one end of said support arm is secured to a horizontally extending elongated rigid support member, said elongated support member having means for securement to said rear bumper.

5. The vehicle hitch assembly of claim 1, including a securing device for securing said one end of said rigid support arm to said vehicle rear bumper which device is adjustably movable in a horizontal direction relative to said receiver insert.

6. The vehicle hitch assembly of claim 5, wherein said another end of said support arm is adjustably securable in a vertical direction to said receiver insert.

7. The vehicle hitch assembly of claim 5, wherein said securing device for said one end of said rigid support arm is movable relative to and fixedly securable to said support arm after adjustment.

8. The vehicle hitch assembly of claim 7, wherein said securing device is comprised of a rigid downwardly open cup dimensioned for reception of a hitch ball secured to an upper surface of said vehicle rear bumper.

9. The vehicle hitch assembly of claim 7, wherein said securing device is comprised of at least one rigid downwardly extending pin for reception in a corresponding pin socket in an upper surface of said vehicle rear bumper.

10. The vehicle hitch assembly of claim 1, said means for securing including an accessory support secured to said hitch receiver insert, whereby said accessory support is supported from said hitch assembly in suspension.

11. A vehicle hitch assembly for suspension support of an accessory from the rear of a vehicle having a rear bumper and a single rearwardly extending arm providing a trailer hitch receiver located on a longitudinal centerline of said vehicle and fixedly secured in a rigid non-hingable manner to a frame of the vehicle in a horizontal direction of extension under said bumper, said hitch assembly comprising;
 a horizontally extending rigid trailer hitch receiver insert for insertion and retention in said vehicle trailer hitch receiver;
 a rigid support arm having one end detachably securable to said vehicle rear bumper and another end thereof securable to said trailer hitch receiver insert;
 securing means vertically rigidly tying and retaining said support arm and said trailer hitch receiver insert together;
 means for securing an accessory support to said hitch assembly whereby said support is supported therefrom in suspension;
 said another end of said support arm is adjustably securable in a vertical direction to said receiver insert; and
 said securing means including an adjustable clamp for vertically clamping said support arm and said trailer hitch receiver insert together.

12. A vehicle hitch assembly for suspension support of an accessory from the rear of a vehicle having a rear bumper and a single rearwardly extending arm providing a trailer hitch receiver located on a longitudinal centerline of said vehicle and fixedly secured in a rigid non-hingable manner to a frame of the vehicle in a horizontal direction of extension under said bumper, said hitch assembly comprising;
 a horizontally extending rigid trailer hitch receiver insert for insertion and retention in said vehicle trailer hitch receiver;
 a rigid support arm having one end detachably securable to said vehicle rear bumper and another end thereof securable to said trailer hitch receiver insert;
 securing means vertically rigidly tying and retaining said support arm and said trailer hitch receiver insert together;
 means for securing an accessory support to said hitch assembly whereby said support is supported therefrom in suspension;
 a securing device for securing said one end of said rigid support arm to said vehicle rear bumper which device is adjustably movable in a horizontal direction relative to said receiver insert; and
 wherein said receiver insert is adjustably securable in a horizontal direction relative to said hitch receiver.

* * * * *